May 3, 1949.　　　　R. C. SCHOCK　　　　2,468,840
HEATER FOR WORT KETTLES
Filed May 27, 1944　　　　　　　　　　　　3 Sheets-Sheet 1

INVENTOR
Robert C. Schock
BY C. P. Goepel
his ATTORNEY

INVENTOR
Robert C. Schock
BY O. P. Goepel
his ATTORNEY

Patented May 3, 1949

2,468,840

UNITED STATES PATENT OFFICE 2,468,840

HEATER FOR WORT KETTLES

Robert C. Schock, New Rochelle, N. Y., assignor to Schock, Gusmer & Co. Inc., Hoboken, N. J., a corporation of New Jersey Application May 27, 1944, Serial No. 537,646

1 Claim. (Cl. 257—197)

This invention relates to means and methods of heating wort prior to its use in the making of beer.

One object of the invention is to subject the wort in the wort kettle to a heat action in order to gradually increase the heat of the wort throughout its mass, and then to further increase its heat content, until the desired evaporation has been obtained. At the same time the wort mass is subjected to increasing velocities of circulation currents, in order to bring the wort to the desired temperature as quickly as possible, and to facilitate evaporation of the excess water, the circulation of the wort being from the central portion of the wort kettle to the perimeter thereof, and the transfer of heat from the heat source to the wort being assisted by convection currents. On the one hand, the higher temperatures are particularly important on account of their actions upon the constituents of the wort in the kettle, and on the other hand, the provision of convection current circuits within the main circulation current are also important to assure a rapid and thorough heating.

The invention comprises a heating unit having varying heat units supplied to it for their exchange with a mass to be heated, and to keep said mass heated, such exchange taking place first at relatively lower temperatures, then at relatively higher temperatures, and then again at lower temperatures, the latter if desired.

The invention comprises, in certain of its embodiments, in addition to the means for circulating the mass to be heated, the provision of supplementary or booster circulation means particularly applicable to larger sized kettles.

More particularly, the invention includes a heating unit of circular form, disposed above its supporting wall to allow for passage of the wort or other mass between it and said wall, said heating unit being connected with a heating medium supply and with a discharge for the same, and with regulating means for said supply of heating medium at temperatures corresponding to low and high pressure steam. Also, it includes a heating unit divided into two compartments each with a supply and discharge for the heating medium, or in two separate heating units superposed upon each other, or otherwise disposed in relation to each other. Such two, or more heating units, in certain embodiments, are so disposed in relation to the mass to be heated as to assist in the heat transfer of the heat source to the mass being heated.

The method consists in subjecting a liquid mass to the action of increments of heat of increasing temperatures, simultaneously circulating thereby the liquid mass to and away from said heat action, radially thereof, and subjecting said circulating liquid mass to a high temperature heat action thereby increasing the velocity of said circulation to the highest practically obtainable.

Supplementary and synchronously acting heating units may be, in accordance with other embodiments of the invention, provided to boost or augment the main circulation flow of the wort, to the end that the desired temperature of the entire body of the wort be achieved as quickly as possible.

When charges of hops are added, such hops are thoroughly circulated in contact with the heated wort and agitated therewith, to extract from the hop leaves the desired constituents, the high temperature and oxygenation of the hop constituents being especially beneficial.

Having attained the desired evaporation, the heat transfer to the wort can be again reduced, such reduced heat transfer being desirable to prevent the cooling of the wort prior to its transfer to the hop separator.

The invention will be more fully described hereinafter, embodiments thereof shown in the drawings, and the invention will be finally pointed out in the claim.

In the accompanying drawings—

Similar characters of reference indicate corresponding parts throughout the various views.

Figure 1:
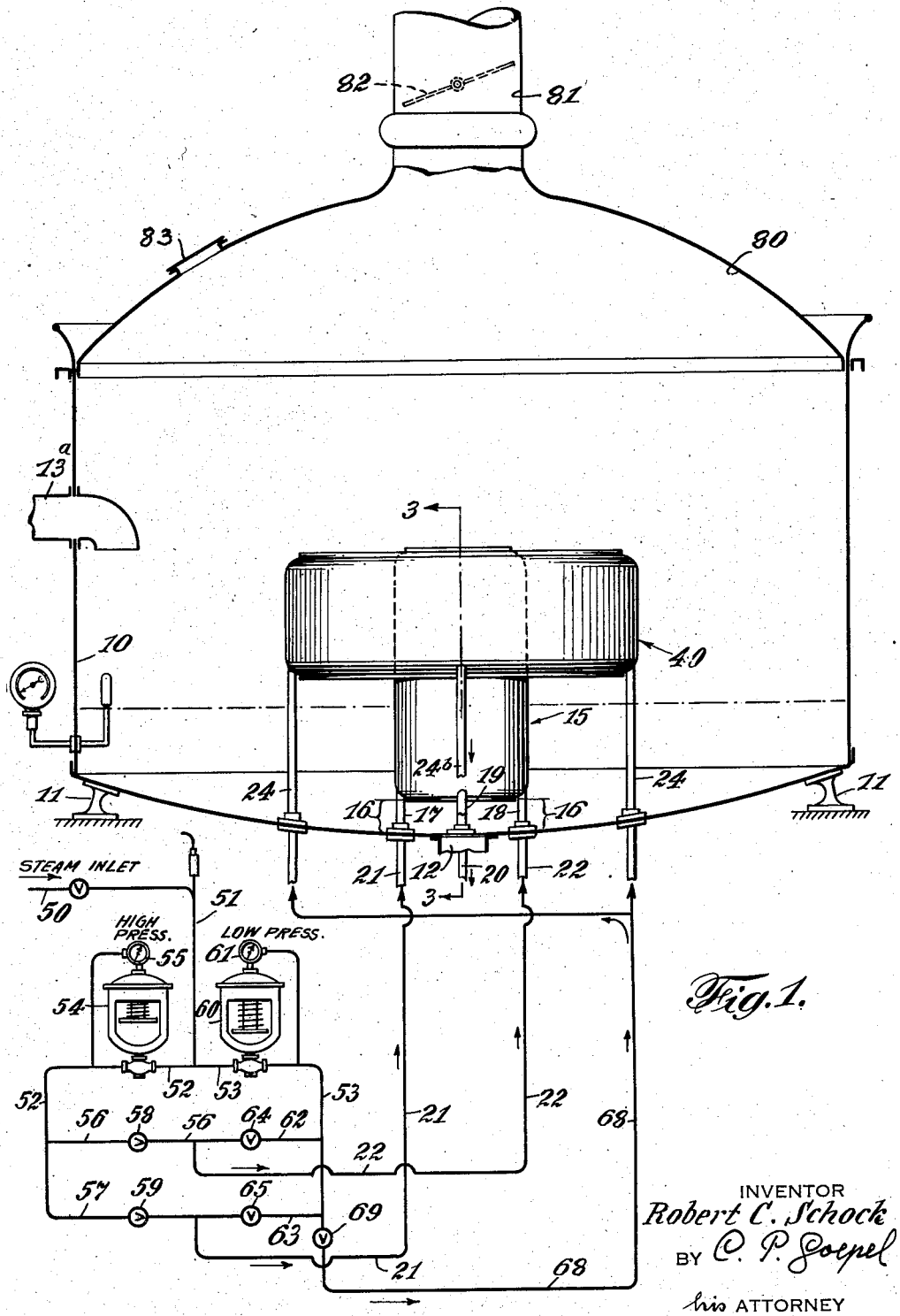
Fig. 1 is a vertical central section of the wort kettle showing in elevation one embodiment of the improved heat exchangers and a steam supply diagram.

Referring to the drawings and more particularly to Fig. 1, the wort kettle 10 is suitably supported by standards 11, and is provided with a wort supply pipe 13a, and wort discharge pipe 12, all as well known.

Figure 2:
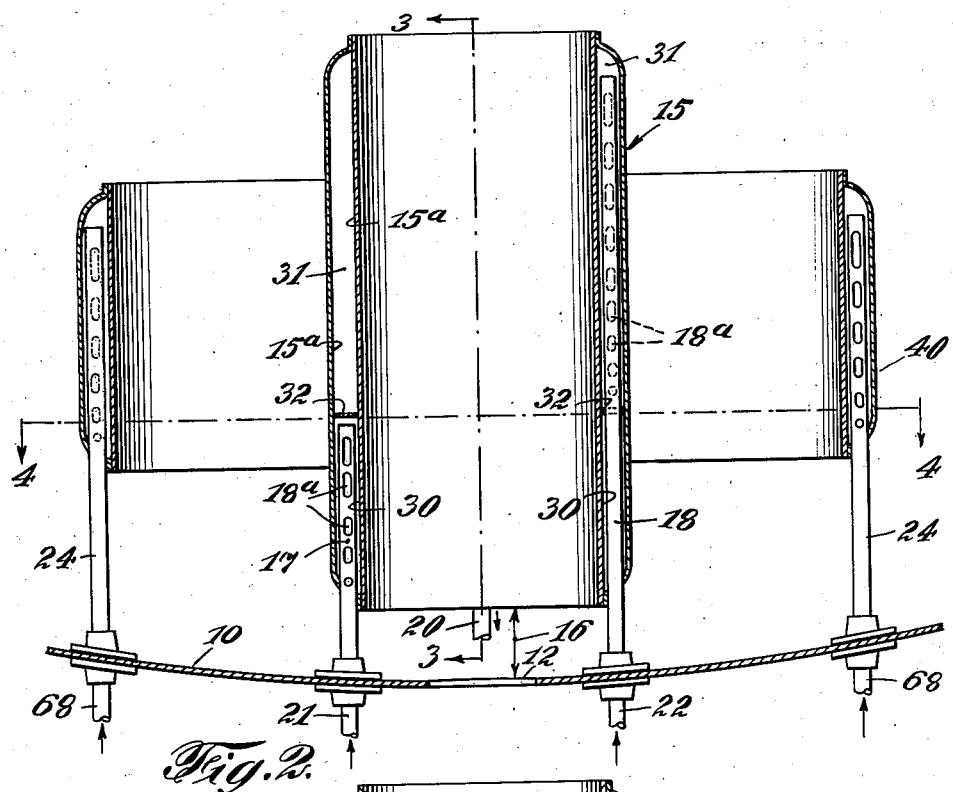
Fig. 2 is a vertical central section of the heat exchangers shown in Fig. 1.
Figure 3:
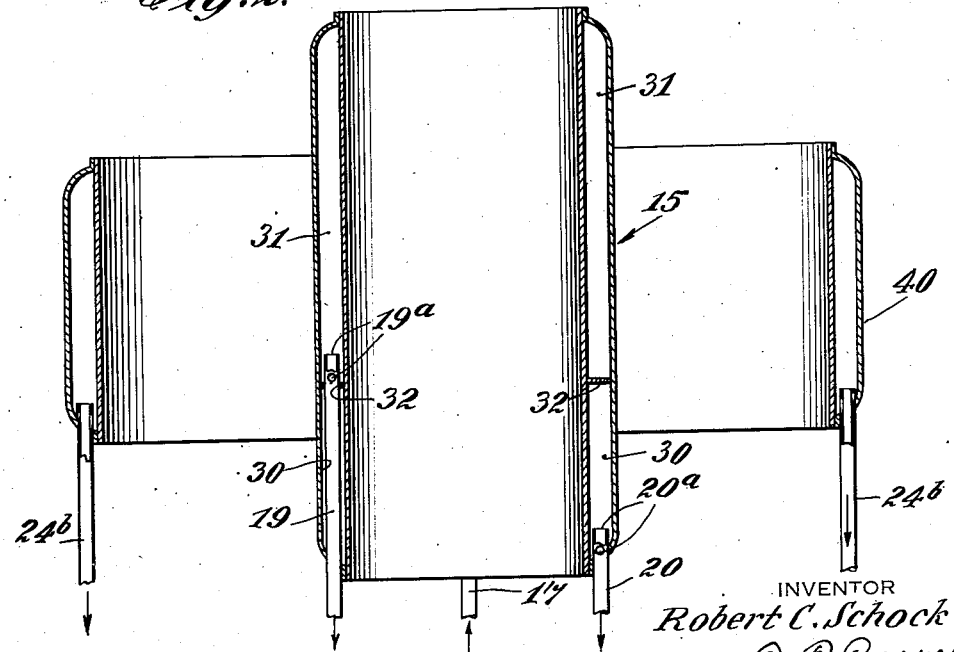
Fig. 3 is a similar section taken on line 3—3 of Fig. 1 or on line 3—3 of Fig. 2.

The invention consists in the provision of a heater or heat exchanger 15, which in the embodiment, shown in Figs. 2 and 3, is formed of a casing of copper or other metal of low specific heat, that is, good heat conductivity. This casing is preferably vertically elongated and extends in a circle substantially concentric with the vertical axis of the kettle 10. The bottom of the casing is a suitable distance above the bottom of the tank to provide a space 16 for the passage of the wort and to prevent the casing from partitioning off one part of the wort in the tank from another part. Steam inlet pipes 17 and 18 and condensed steam discharge pipes 19 and 20, serve to support the casing. Other suitable supporting means may be provided, and the steam inlet and discharge pipes may be otherwise disposed, though the form shown has decided advantages and forms part of the invention.

Figure 4:
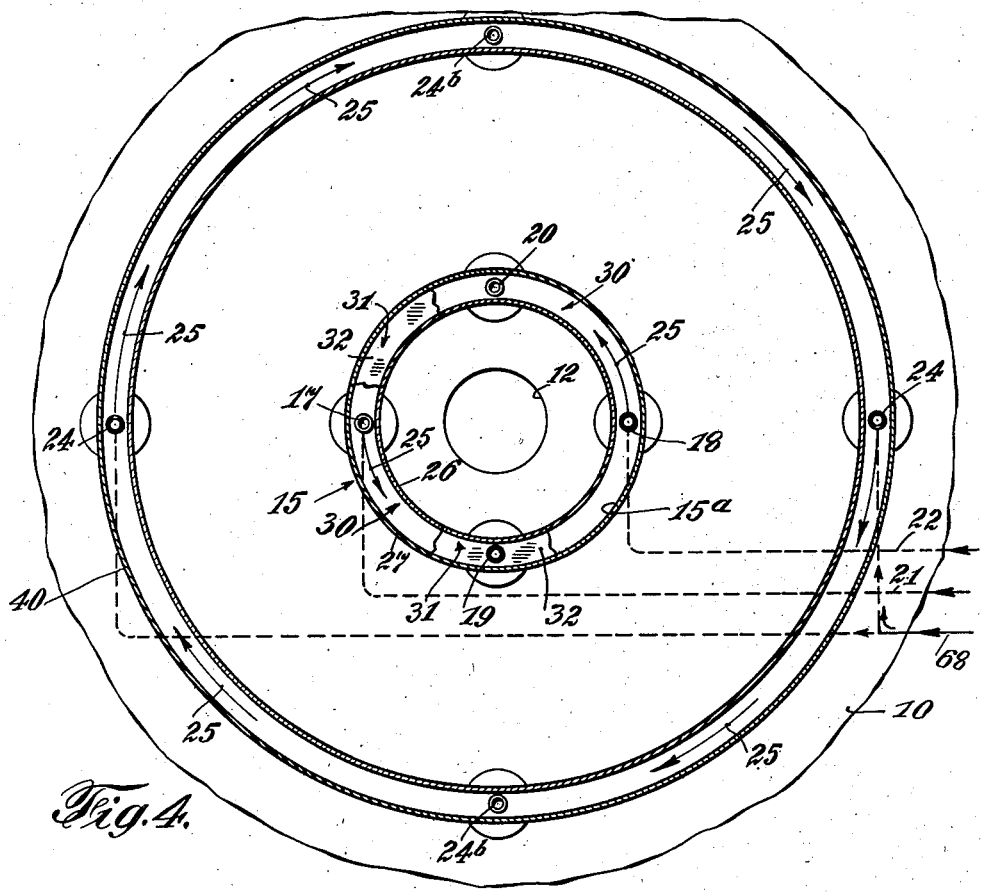
Fig. 4 is a horizontal section taken on line 4—4 of Fig. 2.

The steam inlet pipes 17 and 18 are each provided at one end exterior to the tank with connecting pipes 21 and 22, which in turn are connected with a steam boiler or steam supply. These steam inlet pipes 17 and 18 extend upwardly above the tank bottom, and into the casing of the heat exchanger 15. These pipes 17 and 18 are provided along one side thereof with openings 18a which cause the steam to discharge from these pipes in the form of jets directed in the direction shown by the arrows 25 in Fig. 4. This direction can be reversed, if desired, by providing the jet opening on the opposite sides. Each series of jets takes a semi-circular horizontal path until the steam sheet formed by the jets passes by the diametrically opposite steam jet pipe and merges with the jets emitted from the latter pipe. The diameter of the pipes 17 and 18 is smaller than the radial distance between the concentric walls 26 and 27 of the casing 15a of the heat exchanger 15, and the lateral spaces thus formed around the pipes provide passages for a continuously rotating steam flow. In consequence, the steam flow takes a circular path circumferentially in the casing, passing around and around, and gives up its heat by conduction and radiation through the walls of the casing to the wort or other matter contiguous to the outer walls of the casing. As the heat is transferred to the liquid wort, steam condenses and the condensed steam or condensate descends, and is discharged through the condensate pipes 19 and 20 having openings 19a and 20a, which pipes are connected with a suitable exhaust.

The principle underlying the operation of the invention is that steam enters the compartment 30 of the casing 15a at the beginning of the operation at low pressure of about 5 pounds and at about 227° F., after the level of the wort being supplied to the wort kettle has reached the top of the compartment 30 or passed slightly above the same. The supply of wort which has a temperature of about 145° F. to 160° F. absorbs heat from the heat exchanger by heat exchange, and the wort is heated thereby, receiving thereby a preliminary heating. This heating sets up convection currents in the wort. The warmer wort rises along the vertical sides of the casing, and the stream thus formed moves radially outwards toward the vertical kettle walls, then descends along the same, and moves radially inwards through the space 16 between the bottom of the casing 15a and the bottom of the kettle 10, to join the upward movement of the wort along the vertical inner and outer sides of the casing, thus distributing the heat received from the heat exchanger throughout the liquid mass. When the preliminary heating of the wort mass reaches the desired temperature, high pressure live steam of about 30 pounds or 274° F. is fed into the supply pipe and into the compartment. Further heat from the highly heated heat exchanger 15 is thus transferred to the wort, and the foregoing circulation is considerably increased. The ebullition is increased, and the bubbles ascend under increasing rapidity, thus increasing the velocity of the convection currents before described, and quickening the heating of the liquid mass. When the mass of the wort throughout has reached the desired temperature and the evaportion has been completed, the steam of high pressure is shut off. The low pressure steam may now be supplied to the compartment 30 of the casing 15a to provide heat to the wort to compensate for any heat losses of the wort while its upper surface and the tank is exposed to the cooling effect of room temperature or while the wort is being drawn off to the hop separator.

Prior to the shutting off of the high pressure steam from the compartment 30, one or more charges of hop leaves are added to the wort, and these follow the mass circulation of the wort and are agitated therewith to the end of extracting from the hop its desired constituents.

The heating of the contents of the kettle from the first entry of the low pressure steam into the heat exchanger is in gradually increasing temperatures, in that first the convection currents and then the mass circulation is gradually increased and then such gradual heating is made uniform throughout. The temperature range at these lower levels is such as to act beneficially upon certain ingredients of the wort. The temperature of the heat exchanger is then increased to the highest of the high pressure steam, and this higher temperature range is particularly important, because, first, it increases the velocity of the circulation of the mass in its passage over the outer walls of the heat exchanger, and secondly, also increases the velocity of the mass circulation along the level of the contents of the kettle, to expose as much of the contents to the oxygen of the atmosphere above said level. These higher temperatures of the mass act upon certain ingredients beneficial to the end result desired, namely, the production of a satisfactory wort. The molecular contact of the mass with the highly heated walls of the heat exchanger subject such contacting molecules to the high temperatures of the walls, and these high temperatures again act beneficially upon the constituents.

For a part of the operation, the damper 82 of the vapor stack 81 is so regulated, the man hole cover 83 being closed, as to increase the vapor pressure and thus increase the boiling point of the mass, which also subjects the wort to such higher temperatures. When the boiling point has thus been increased to the extent desired, and as possible by the vapor pressure obtainable, then the cover 83 is opened, and the valve in the stack opened, either partially or entirely, and a circulation of air produced, which exposes the circulating mass at its uppermost portion to such air or with oxygen during its high velocity of movement. The high velocities of the mass circulation bring about a large exposure to such air, which oxygen has a particularly beneficial effect upon the hop ingredients.

To one skilled in the art, this high temperature range will be apparent, in that many constituents of the wort and of the hop, change their character at such higher temperatures, and such changes are beneficial to the production of the wort with its hops preparatory to its further treatment in the making of beer.

To hasten the heat exchange action described, the embodiment shown in Fig. 2, has two superposed compartments in a casing such as described, the compartments 30 and 31 being formed by a horizontal partition 32 circumferentially disposed. The steam inlet pipes are so arranged that the lower compartment 30 is supplied with steam by one jet pipe 17, and the compartment 31 by the jet pipe 18, as shown in Fig. 2.

It is desirable in order to avoid carmelization of the wort to permit the level of the wort to ascend to about the level of the partition 32 before turning on the steam into the lower compartment 30. After the wort has been given a preliminary heating by low pressure steam, then high pressure steam is applied. The slower circulation of the mass in the beginning is then increased in velocity, and this preliminary body of wort is thereby heated. At the same time, the incoming supply of wort through the supply pipe 13a, gradually raises the level of the wort, and this additional supply joins in the mass circulation while the lower compartment 31 is being supplied with high pressure steam. When the level of the wort extends above the top of the compartment 31, then first low pressure steam and then high pressure steam may be supplied thereto, or high pressure steam alone, and the foregoing heating of the wort and circulation of the mass correspondingly increased. For simplicity of manufacture, I have shown one casing with two compartments, but two independent casings one superposed upon the other could be used.

When the wort has been subjected to sufficient excess water evaporation to the extent well known, the high pressure steam supply is shut off from either or both of the compartments, and low pressure steam may be supplied to either or both of the compartments, to provide the compensatory heat transfer before referred to.

To amplify the mass circulation, another part of the invention is the provision of a subsidiary heat exchanger.

Figure 5:
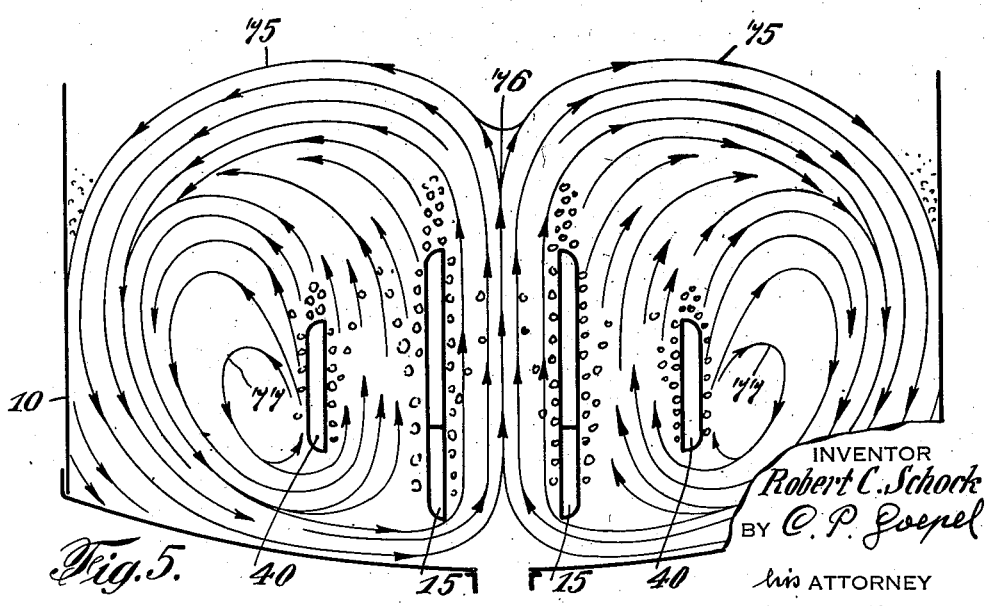
Fig. 5 is a diagram of the circulating currents actuated by the use of heat exchangers such as shown in Figs. 2, 3 and 4.

This is shown in the embodiment of Figs. 1, 2, and 3, which has another heat exchanger 40 constructed generally like the heat exchanger 15, but of larger diameter and preferably with only one compartment. It is substantially concentric with the first and smaller diameter heat exchanger 15. The relative proportions of both heat exchangers and kettle are shown in Fig. 1. The spacing between the lower part of the casing 40 and the bottom of the kettle is somewhat larger, to provide for the larger mass of the circulating current flow of the wort. The heat exchanger 40 is placed intermediately of the heat exchanger 15 and the vertical walls of the kettle 10. This heat exchanger 40 is provided with low pressure steam only, and is specially advantageous in order to set up independent convection currents. It is preferable not to supply high pressure steam to this larger heat exchanger since the ebullition set up adjacent to it, may set up secondary currents in the wort which might disturb the mass circulation above described and produced by the inner heat exchanger, whereas the use of low pressure steam in the heat exchanger 40 sufficiently heats the adjacent body of wort to set up convection currents subsidiary to and in augmentation of the main current set up by the inner heat exchanger when high pressure steam is used therein. The heat exchanger 40 thus acts in the nature of a booster of the main current. The main current moves upwardly centrally of the tank induced by the hollow interior of the inner heat exchanger, and as the upward movement of the wort is most violent at the center thereof, the mass must move radially outwards toward the vertical wall of the circular kettle, then downwardly, and then radially inwards, to again ascend centrally of the heat exchanger 15, as shown generally in Fig. 5. In a larger kettle, such a circulation as just described would set up a pocket circumferentially disposed in which eddy currents would form and the whirls thereof may captivate some of the wort rendering it less subject to the heat transfer intended. Or, hop leaves may gather in such pockets. To overcome such objectionable features, the outer heat exchanger 40 is so placed as to subject this portion to a controlled circulation which merges into the main circulation, as shown in Fig. 5. It is important to note that the molecules of the wort which pass contiguously to the hot walls of the heat exchangers are subjected to the high temperatures thereof, which promptly bring about ebullition, the heat exchange of high temperature acting upon the constituents of the wort and hop while the mass is rapidly moving by its momentum along the exterior surfaces of the heat exchangers.

In Fig. 5 is shown, the main circulation current 75 from the central part 76 outwards. In the pockets of this main current 75 produced by heat exchanger 15, the heat exchanger 40 is placed which sets up a subsidiary current 77 which is subsidiary to the main current and not in conflict therewith.

It is seen that in addition to a heat exchanger in which heating fluids of varying heat properties give up their heat to the wort in exchange for the lower temperature heat passing from the wort to the heat exchanger, the positioning of such a heat exchanger, or a plurality of the same, is such as to set up in the wort advantageous convection currents to transfer the heat abstracted from the heat exchangers throughout the body of the wort, in addition to the heat transfer to the wort when it is contiguous to the heat exchangers. The positioning of the heat exchangers is such as to avoid setting up currents which may be impeded by the heat exchangers, and in fact, is such as to set into operation a dominant mass circulation.

The general dimensions of one practical installation are as follows:

Diameter of kettle: 18 feet; shell height: 8 feet; diameter of outer heat exchanger: 8 feet; diameter of inner heat exchanger: 38 inches; height of outer heat exchanger: 3 feet; height of inner heat exchanger: 5 feet; space from bottom of tank of inner heat exchanger: 9 inches; space from bottom of tank of outer heat exchanger: two feet nine inches; radial distance between casing walls of inner heat exchanger: 3 inches.

These dimensions apply to one installation. Installations differ in respect to locality and capacity, and smaller or larger dimensions would be applicable.

The pressures and temperatures of the saturated steam are as follows:

| Gage press., p. s. i. | Abs. press., p. s. i. | Temp., °F. |
| --- | --- | --- |
| 5 | 19.7 | 227.14 |
| 6 | 20.7 | 229.78 |
| 7 | 21.7 | 332.32 |
| 8 | 22.7 | 234.69 |
| 9 | 23.7 | 237.12 |
| 10 | 24.7 | 239.33 |
| 30 | 44.7 | 274.03 |
| 40 | 54.7 | 286.07 |
| 50 | 64.7 | 297.09 |

The steam in condensing, gives up its latent heat of vaporization, and imparts to the pipes its latent heat which becomes free and by conduction heats the surrounding medium. The expansion of the interior layers of the surrounding mass, as the wort, causes them to become less dense and rise in the mass, and these are replaced by the colder and denser layers. The quantity of heat lost or gained in a second is proportional to the difference between the temperature of the heat source and that of the surrounding mass, until a point is reached where the quantity of heat emitted by the heat source is equal to that absorbed by the mass, and the temperature of the mass then remains stationary.

In Fig. 1, there is also shown a diagram of pipe connections in order to supply the low and high pressure steam to the vertical pipes of the heat exchangers 15 and 40 in gradual increments. A steam inlet from a boiler or other source of steam is indicated by 50. A pipe 51 leads to two branches 52 and 53. In branch 52 is a high pressure valve 54, with gauge 55, and this branch 52 has two further pipes 56 and 57, each with a valve 58 and 59. The branch 53 has a low pressure valve 60 with a gauge 61. The branch 53 has two pipes 62 and 63, each with a valve 64 and 65. The pipe 22 is connected with the junction of pipes 56 and 62, and the pipe 21 is connected with the junction of pipes 57 and 63. A pipe 68 having a valve 69 is connected with the jet pipe 24 of the heat exchanger 40. The operation is as follows: With valves 58 and 59 closed, and valves 64, 65 and 69 open, low pressure steam enters the jet pipes of the heat exchangers. With valve 58 open, valve 64 closed, high pressure steam enters the jet pipe 18. With valve 59 open, valve 65 closed, high pressure steam enters the jet pipe 17.

The break of the wort in the kettle affects the hop character of the beer, and the break among other things, depends on the boiling conditions.

The draft on a stack of a kettle will vary from day to day, and even during any one day, due to differences in barometric pressure. The amount of evaporation will vary with the draft. More of a break is obtained by a vigorous boiling. The vigorousness of the boiling of the kettle varies with the draft. By regulating the draft, the same boiling conditions for each brew approximately the same coagulation of the proteins can be obtained other things being equal. Similarly by regulating the steam inlets in accordance with charts based upon recording thermometer readings, the velocities of the mass can be determined, the thermometer being suitably placed, as known, within the kettle, and the recording apparatus outside of the kettle.

The amount of protein thrown out of the wort, and which makes up most of the break, will be less with a quiet-boiling kettle or one which just simmers than with a wort which boils vigorously.

The wort kettle 19 is closed at its top by its roof 80 having a stack 81 and a valve 82. By regulating the valve 82, the pressure above the level of the wort is varied, the pressure increasing when the valve 82 is closed, and thereby the boiling point of the wort and its ebullition is varied. Pressure increases the boiling point, increases the heat content of the mass assuring the desired actions. The amount of vaporization is also varied. On the other hand, the heat input under the high pressure steam heat exchange increases the vigorousness of the agitation. Thus, by a regulation of these factors, the results desired in any brewery depending upon the wishes of the brewmaster can be kept substantially uniform by the attendants.

The high pressure steam referred to herein is from 25 to 50 pounds, the low pressure is from 5 to 9 lbs. The wort temperature when it enters the tank is about from 145 to 160° F.

The invention then comprises the subjection of the wort to a graduated preliminary heating and then to final heating by varying heat properties of the heat medium. It may be applied to other embodiments than described. The embodiments may be variously disposed within the kettle and cause an automatic convection current flow. The presently preferred embodiment has the advantage of requiring relatively small heat exchangers thus saving in material costs, and in utilizing the sloping or dished bottom for providing a gravity action for the wort inducing a flow towards the central part of the tank and towards the heat exchanger. The radially outward flow along the level of the wort is propelled by the ascending heated wort in the bore adjacent the heat exchanger. To aid in such outward flow, the casing of the heat exchanger may be provided with heat dissipating fins, which fins may be shaped to increase the upward flow at the central port of the kettle, or the vanes may be shaped to give a rotary movement to the body of the wort at the same time maintaining the convection current and the main circulation before described.

The heat exchangers for varying heat deliveries may have other applications than to the heating of wort, for instance, when a body to be heated is desired to be subjected to a preliminary heating under one temperature range, and then have the heat delivered to the body under another temperature range, under controlled increments. In the embodiments, the condensed steam may be subjected to reheating or the like, and thus placed again into circulation through the casing. Instead of steam, another heat exchange medium of any practical form may be utilized.

The characteristic of the present specific embodiments is that the steam inlets or jets circulate horizontally in the casing and preferably supplement each other when more than one supply is utilized, and by such horizontal movement supply the circular walls of the casing with heat, the upper part of the casing providing probably more heat than the lower part due to the larger jet holes at the top and the pressure in the vertical steam supply pipes, which has the advantage of enabling the cooler mass of the wort to impinge first upon the cooler portion, and when partly heated being then subjected to higher temperatures, providing thereby a greater and a more needful differential at that locality.

I have described several forms of my invention, but obviously various changes may be made in the details disclosed without departing from the spirit of the invention as set out in the following claim.

What I claim is:

In a wort kettle having a vertical cylindrical portion and a substantially horizontal bottom for said cylindrical portion, and having means for heating the contents of the kettle, the combination of a centrally disposed hollow cylindrical member with its lower end in proximity to said bottom, and its axis centrally disposed substantially coincident with the axis of the kettle, said cylindrical member being radially within said first heating means for heating the wort at the central part of the kettle, to move the central part of the wort upwardly, and to set up a circulation of the wort radially outwards at the level of the wort, downwardly along the walls of the kettle and radially inwards at the bottom of the kettle, a horizontal transverse partition disposed along the vertical-length of the interior of the said cylindrical member, dividing said interior into two independent compartments, the upper compartment being larger than the vertical length of the lower compartment, means for supplying one of the compartments with low pressure steam, and means independent of the first supply means for supplying the other compartment with high pressure steam, whereby on supplying the high pressure steam the velocity motion of the wort is increased, and breaks in the hop and wort boiling process are successively facilitated.

ROBERT C. SCHOCK.

REFERENCES CITED

The following references are of record in the file of this patent:

UNITED STATES PATENTS

| Number | Name | Date |
|---|---|---|
| 289,717 | Sauser et al. | Dec. 4, 1883 |
| 422,260 | Stephens | Feb. 25, 1890 |
| 732,350 | Henius | June 30, 1903 |
| 953,607 | Grantzdorffer | Mar. 29, 1910 |
| 1,198,536 | Goen | Sept. 19, 1916 |
| 1,843,321 | Hamburg | Feb. 2, 1932 |
| 1,977,738 | Olson | Oct. 23, 1934 |
| 1,980,623 | Kay et al. | Nov. 13, 1934 |
| 2,322,749 | Silhavy | June 29, 1943 |
| 2,354,093 | Stein | July 18, 1944 |

FOREIGN PATENTS

| Number | Country | Date |
|---|---|---|
| 364,583 | Germany | Nov. 28, 1922 |